(No Model.) 12 Sheets—Sheet 1.
C. C. SMALL.
NAIL MAKING AND DISTRIBUTING MACHINE.

No. 583,093. Patented May 25, 1897.

WITNESSES.
J. T. Ball.
J. M. Dolan.

INVENTOR.
Chester C. Small
by his attys
Clarke & Raymond (No Model.)    12 Sheets—Sheet 4.

C. C. SMALL.
NAIL MAKING AND DISTRIBUTING MACHINE.

No. 583,093.    Patented May 25, 1897.

WITNESSES.
J. T. Ball
J. M. Dolan.

INVENTOR
Chester C. Small
by his atty
Clarke & Raymond (No Model.)  12 Sheets—Sheet 5.
C. C. SMALL.
NAIL MAKING AND DISTRIBUTING MACHINE.

No. 583,093. Patented May 25, 1897.

WITNESSES.
J. T. Ball.
J. M. Dolan.

INVENTOR.
Chester C. Small
by his attys
Clarke & Raymond

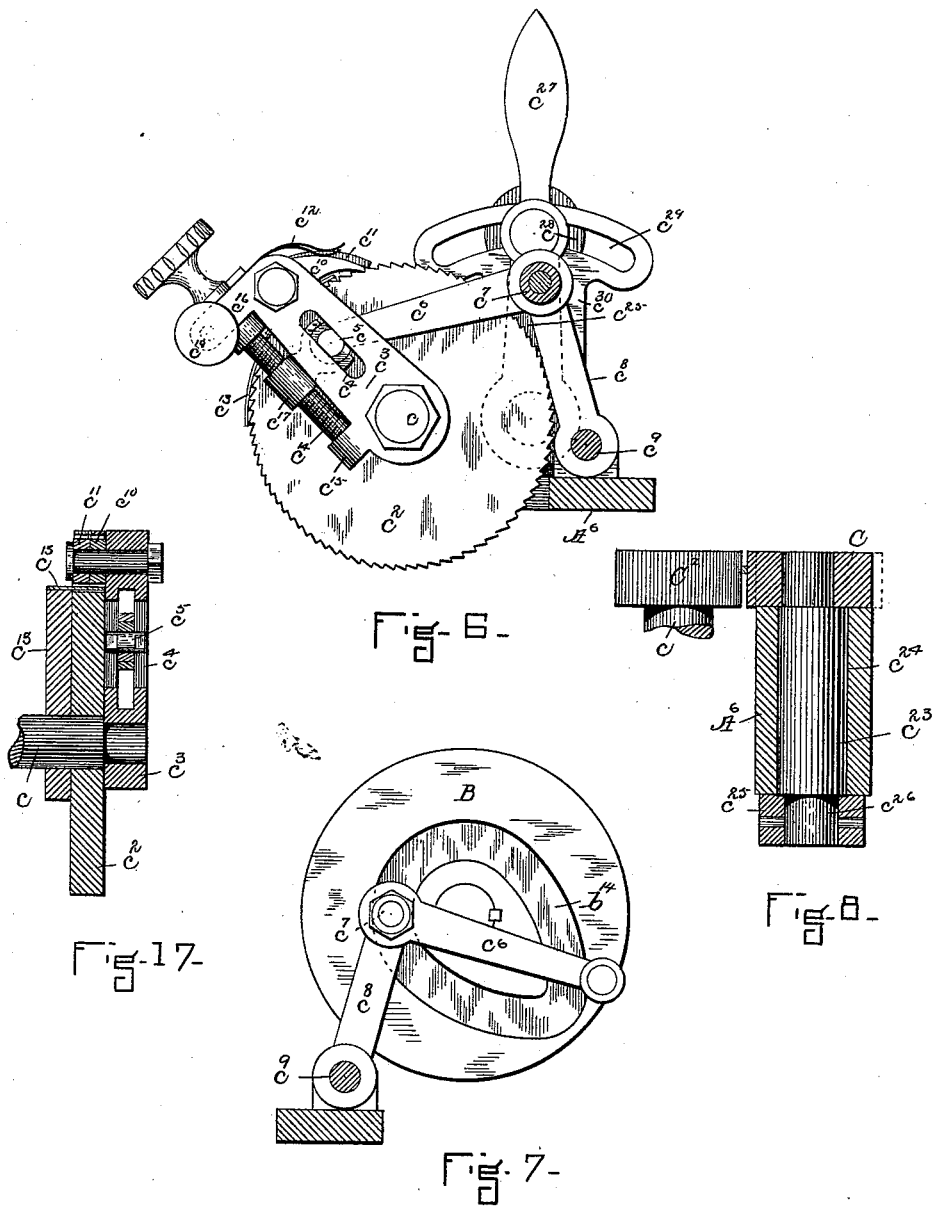

(No Model.) 12 Sheets—Sheet 7.
C. C. SMALL.
NAIL MAKING AND DISTRIBUTING MACHINE.

No. 583,093. Patented May 25, 1897.

WITNESSES. INVENTOR.
J. T. Ball. Charles C. Small
J. M. Dolan. by his attys
Clarke & Raymond (No Model.) 12 Sheets—Sheet 8.

C. C. SMALL.
NAIL MAKING AND DISTRIBUTING MACHINE.

No. 583,093. Patented May 25, 1897.

WITNESSES.
J. T. Ball
J. M. Dolan

INVENTOR.
Chester C. Small
by his attys
Clarke & Raymond (No Model.) 12 Sheets—Sheet 9.
C. C. SMALL.
NAIL MAKING AND DISTRIBUTING MACHINE.

No. 583,093. Patented May 25, 1897.

WITNESSES.
J. T. Ball
J. M. Dolan

INVENTOR
Chester C. Small
by his attys
Clarke & Raymond (No Model.) 12 Sheets—Sheet 10.
C. C. SMALL.
NAIL MAKING AND DISTRIBUTING MACHINE.
No. 583,093. Patented May 25, 1897.
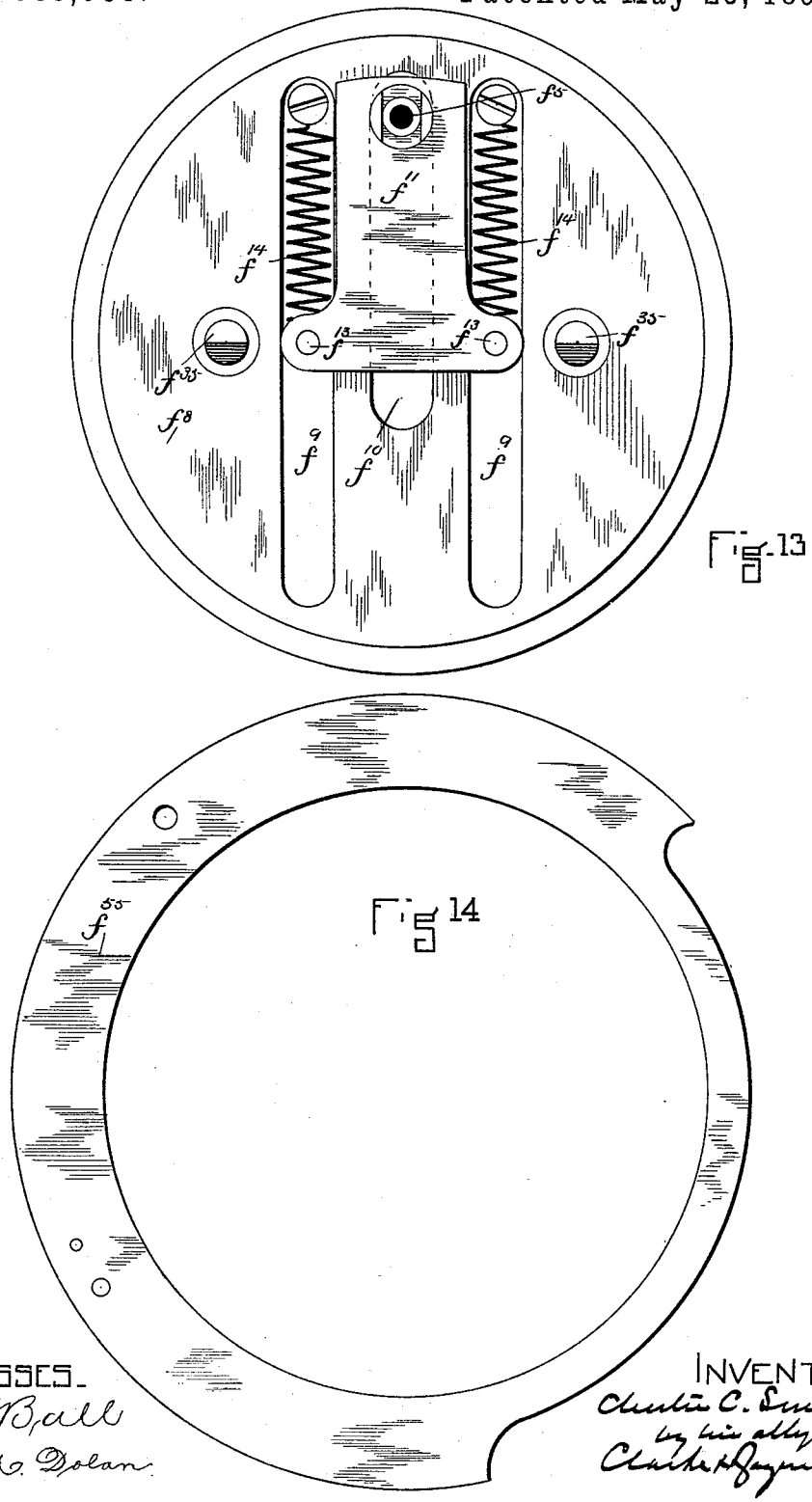
WITNESSES
J. T. Ball
J. M. Dolan
INVENTOR
Christie C. Small
by his atty
Charles H. Raymond

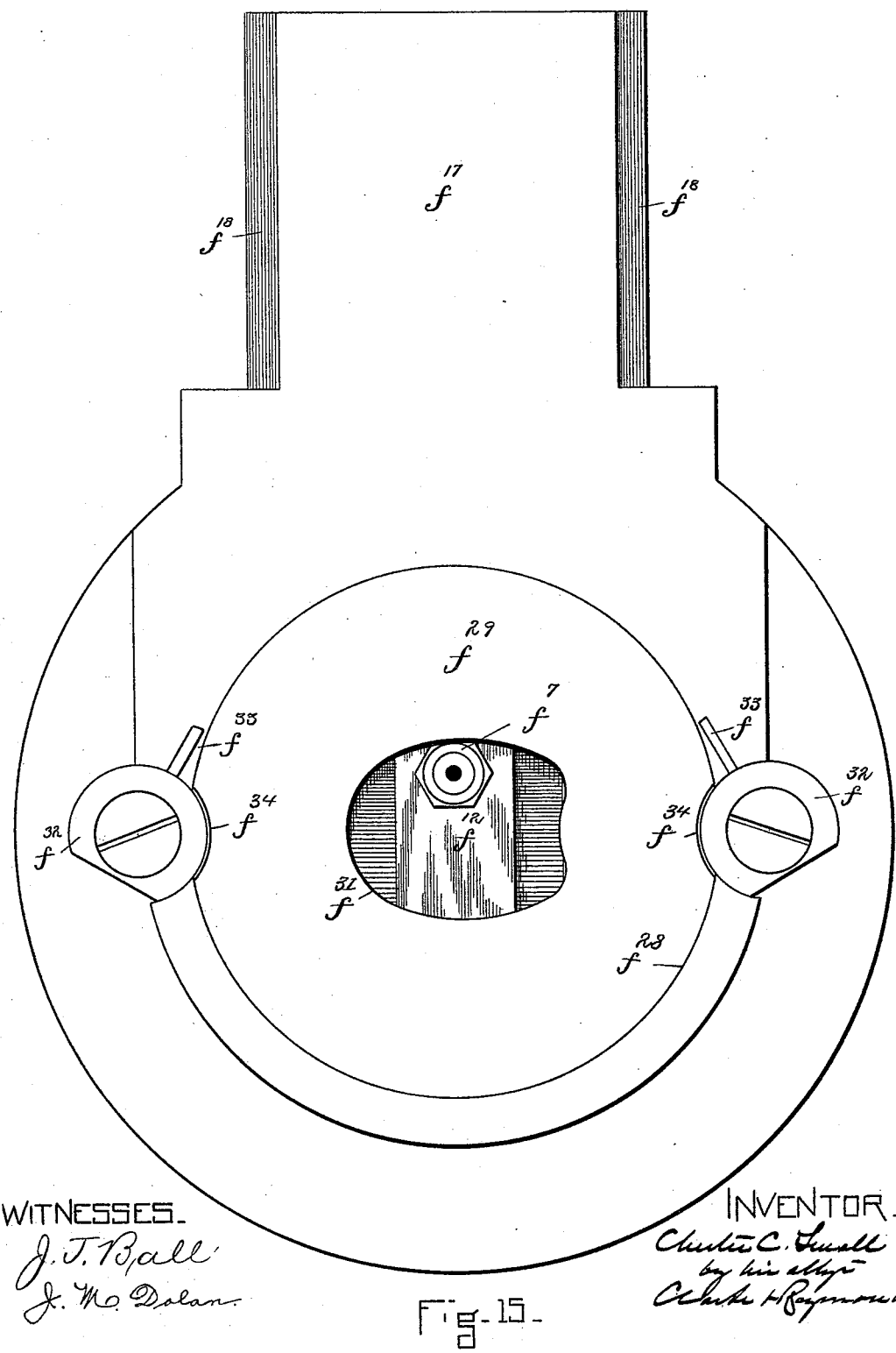

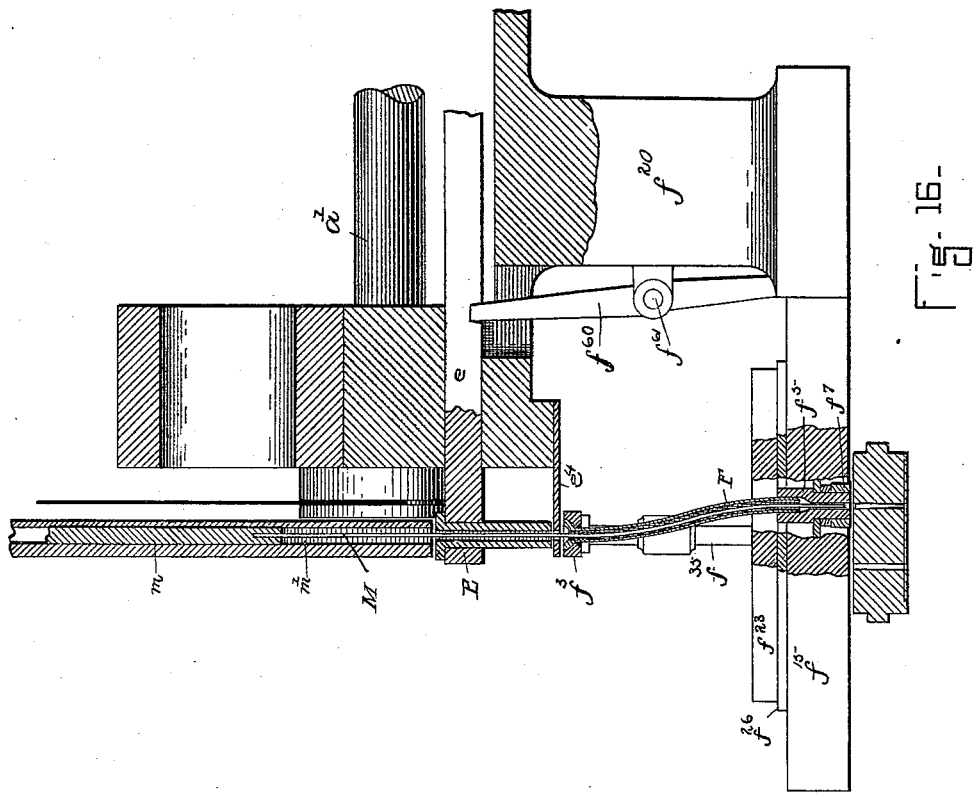

UNITED STATES PATENT OFFICE.

CHESTER C. SMALL, OF NEWTON, MASSACHUSETTS, ASSIGNOR, BY MESNE ASSIGNMENTS, TO JAMES W. BROOKS, OF PETERSHAM, AND JOHN BROOKS, OF CAMBRIDGE, MASSACHUSETTS, TRUSTEES.

NAIL MAKING AND DISTRIBUTING MACHINE.

SPECIFICATION forming part of Letters Patent No. 583,093, dated May 25, 1897.

Application filed October 17, 1889. Serial No. 327,387. (No model.)

*To all whom it may concern:*

Be it known that I, CHESTER C. SMALL, a citizen of the United States, residing at Newton, in the county of Middlesex and State of Massachusetts, have invented a new and useful Improvement in Nail Making and Distributing Machines, of which the following is a full, clear, and exact description, reference being had to the accompanying drawings, forming a part of this specification, in explaining its nature.

The invention is an improvement upon that described in my Patent No. 375,209, dated December 20, 1887; and it relates to various details of organization and construction, whereby a greater accuracy in the delivery of the nail is obtained and the operative parts of the machine are more conveniently arranged.

The invention further relates to various details of construction and organization, all of which will hereinafter be described.

Figure 1:
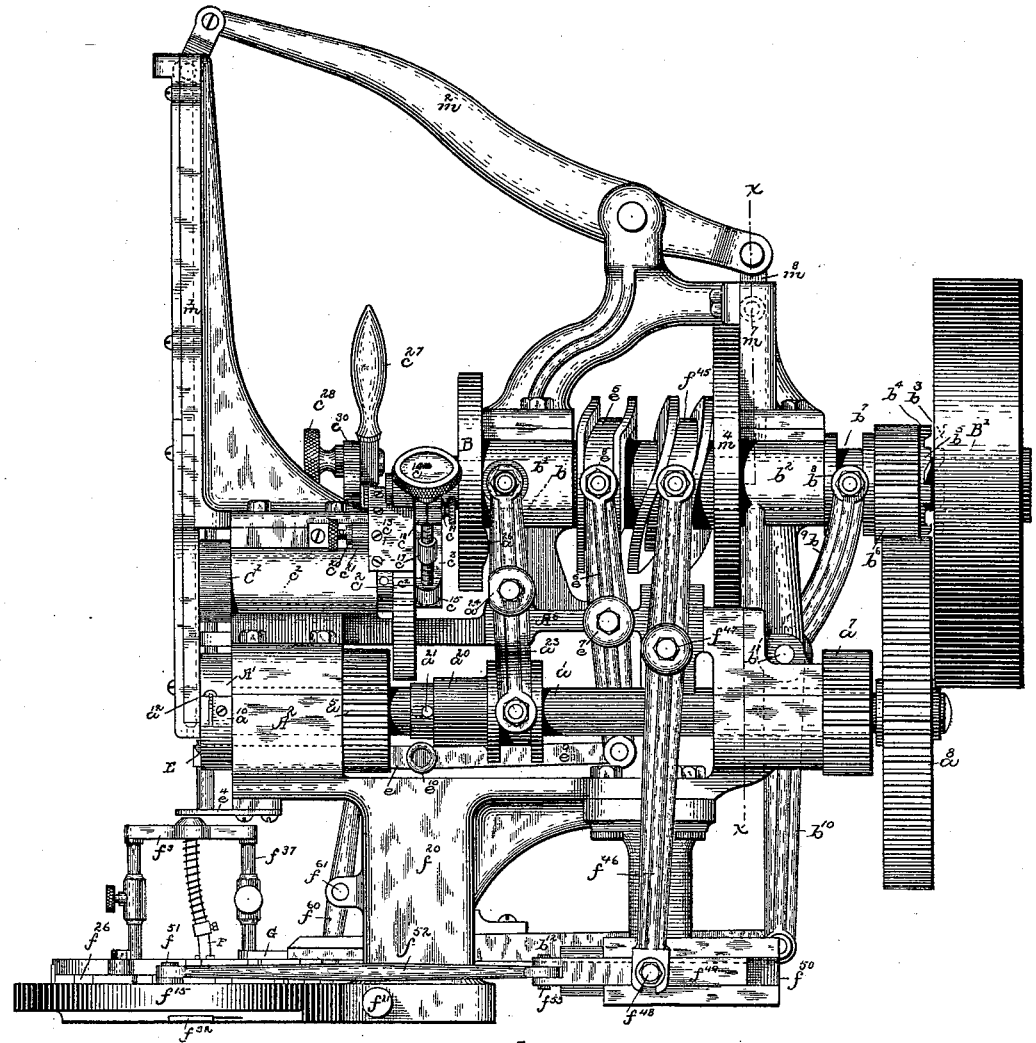
Figure 2:
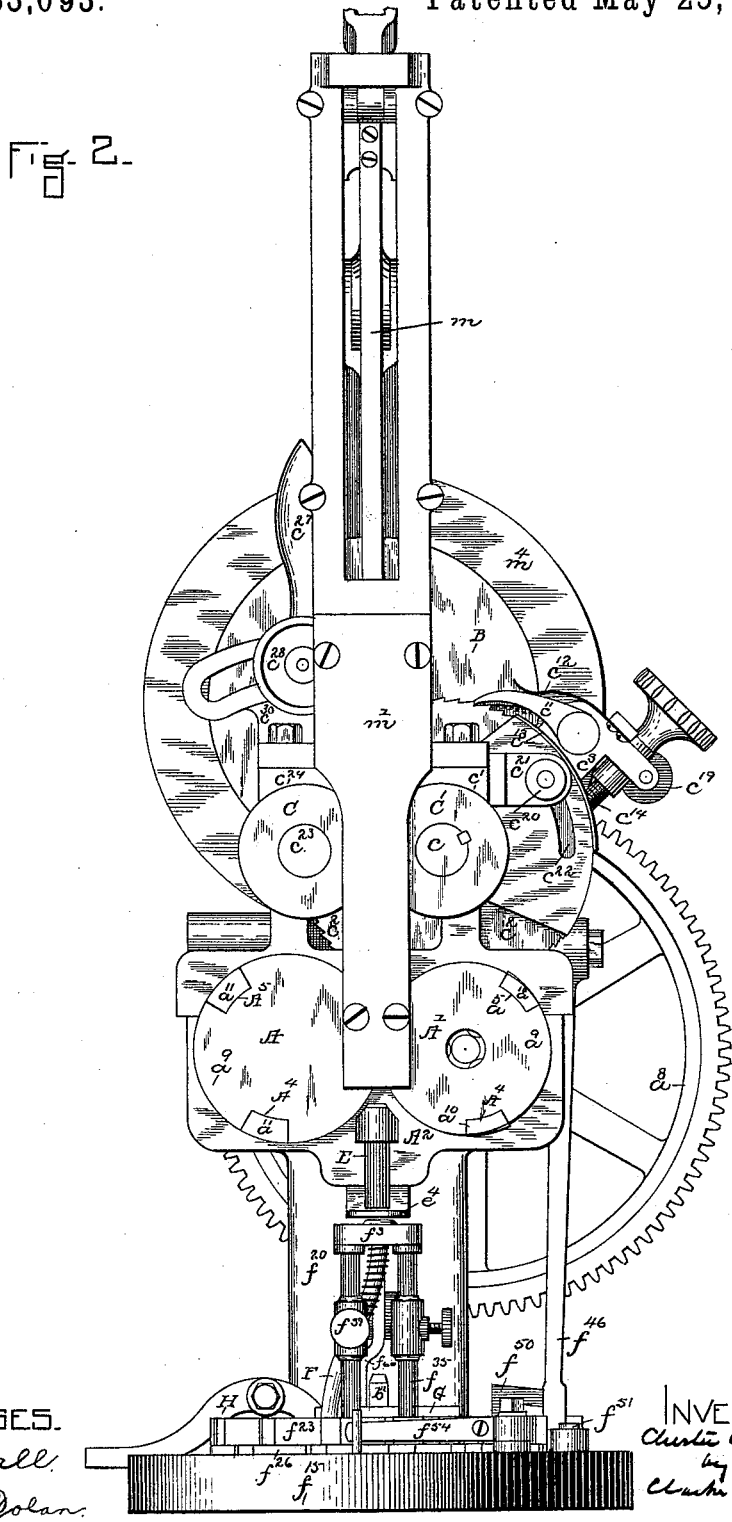
Figure 3:
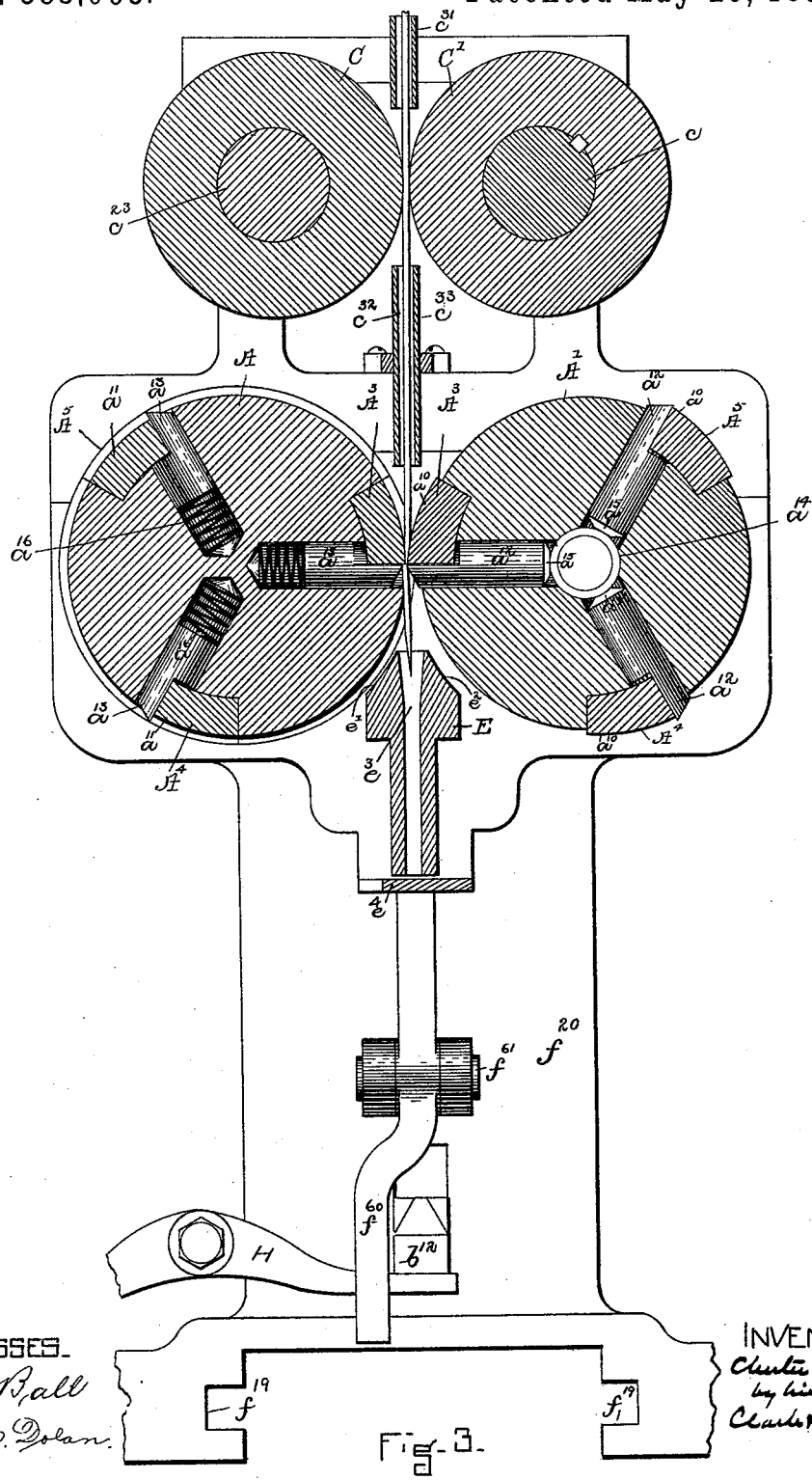
Figure 4:
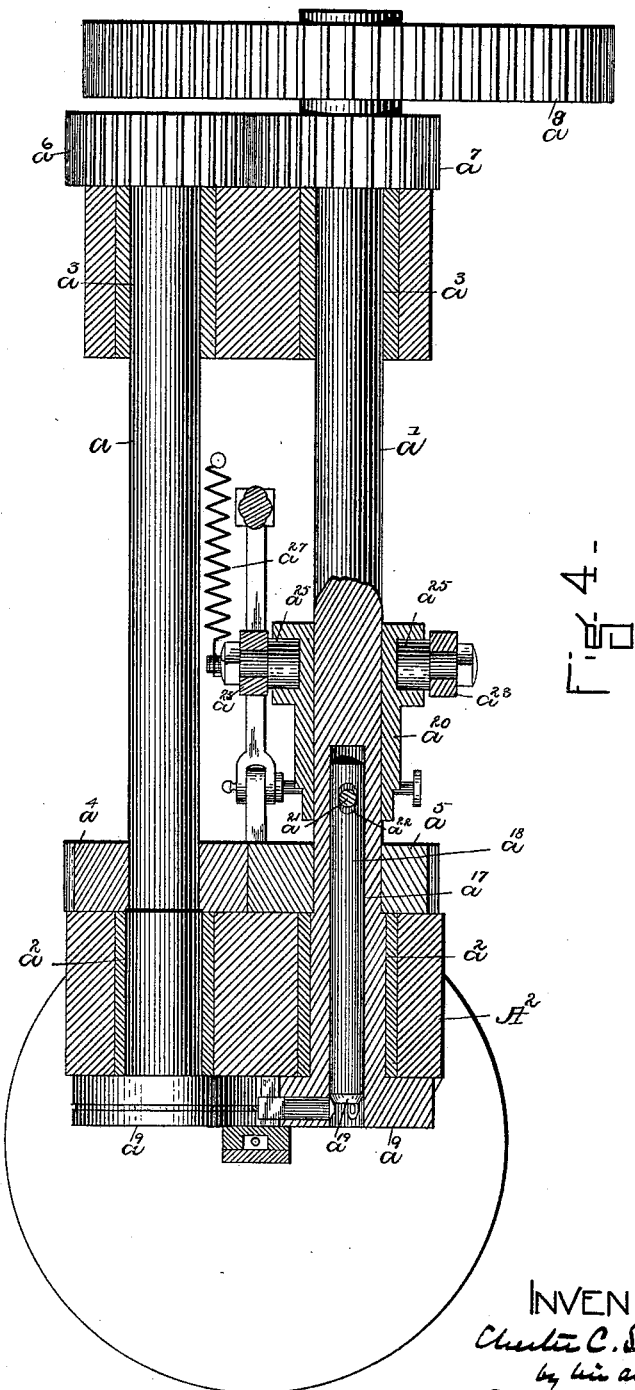
Figure 5:
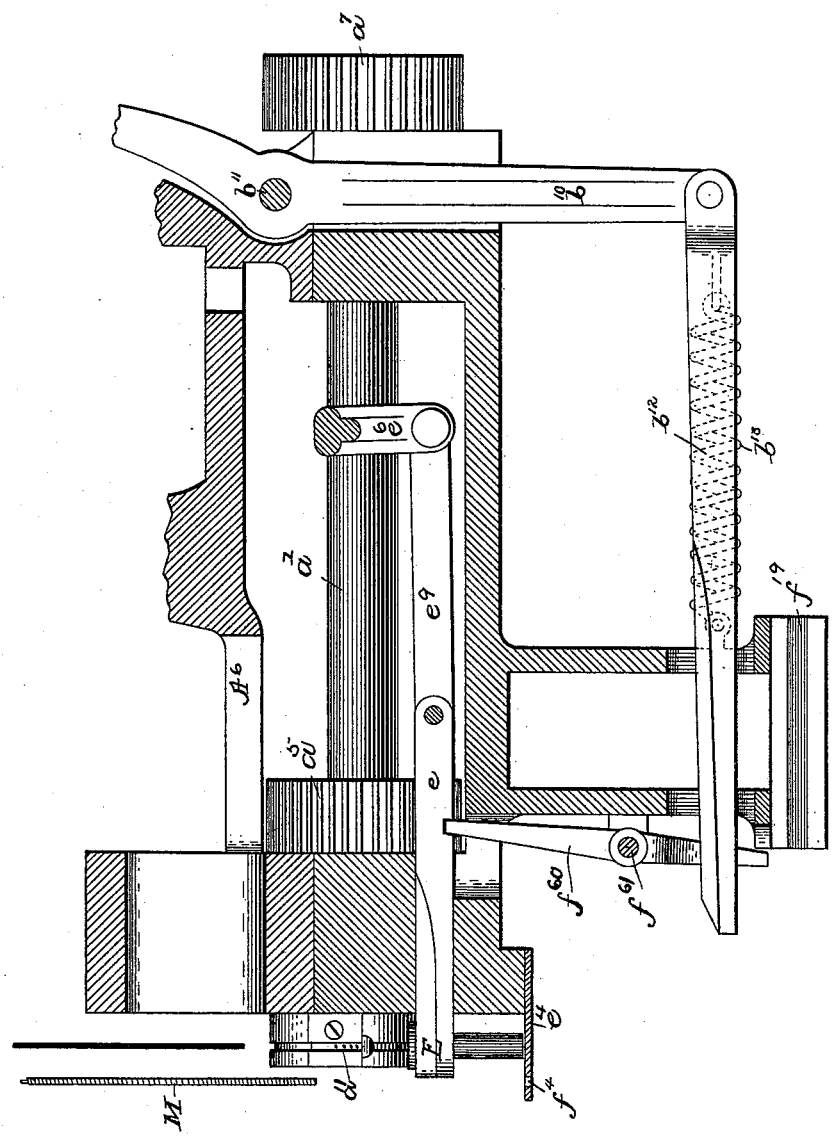
Figure 9:
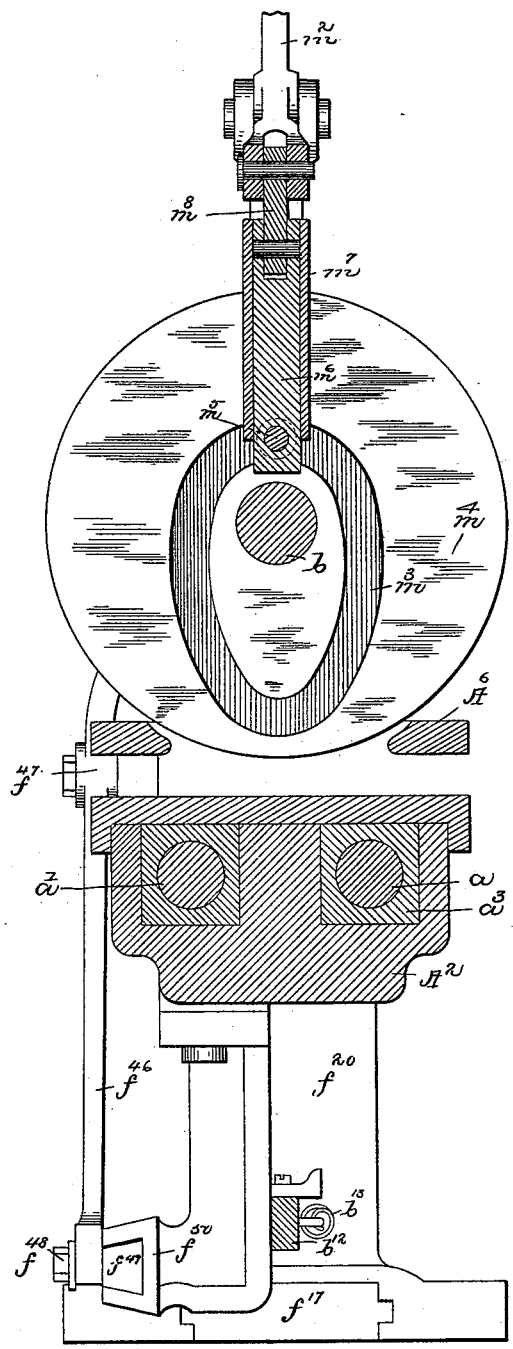
Figure 10:
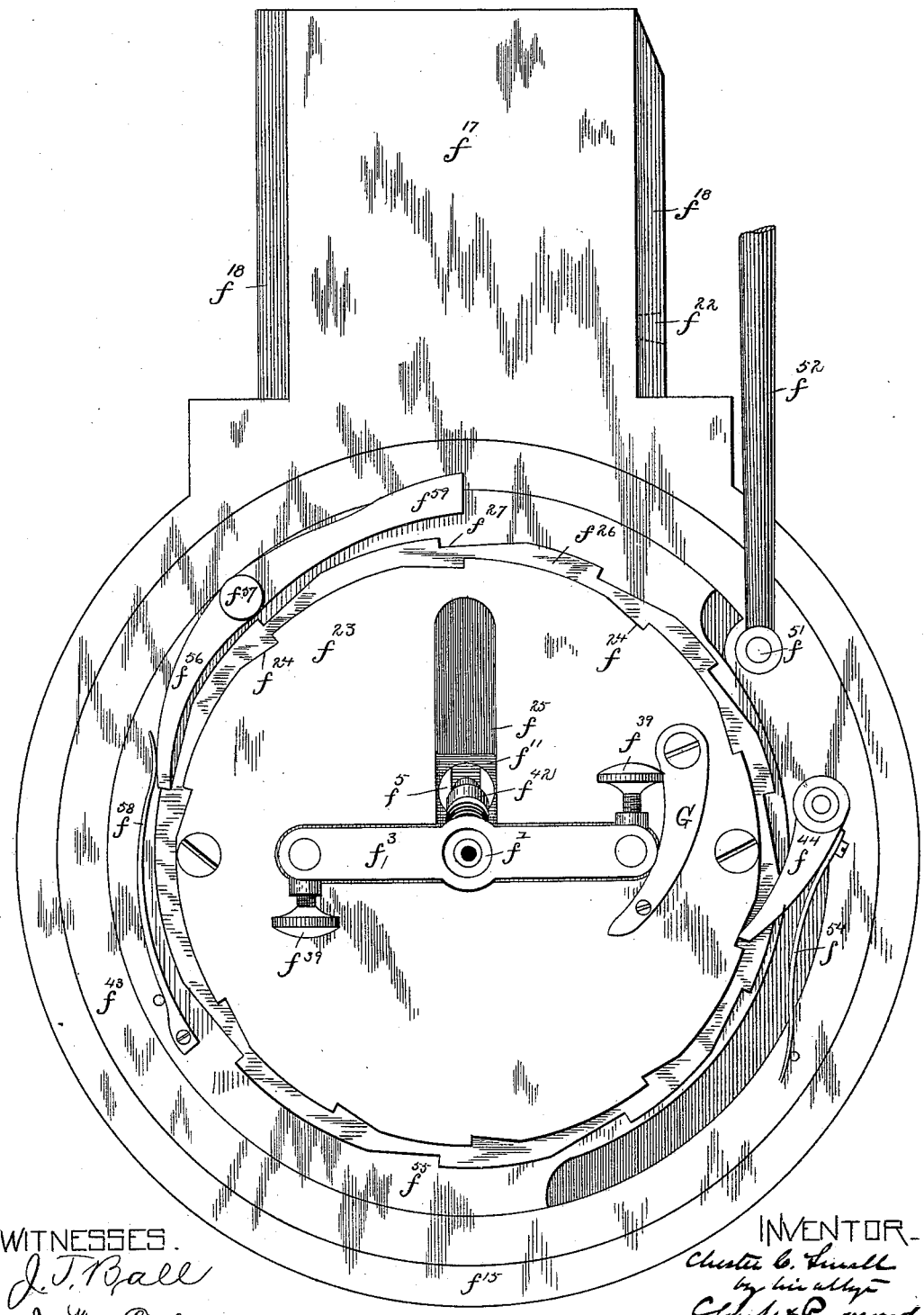
Figure 11:
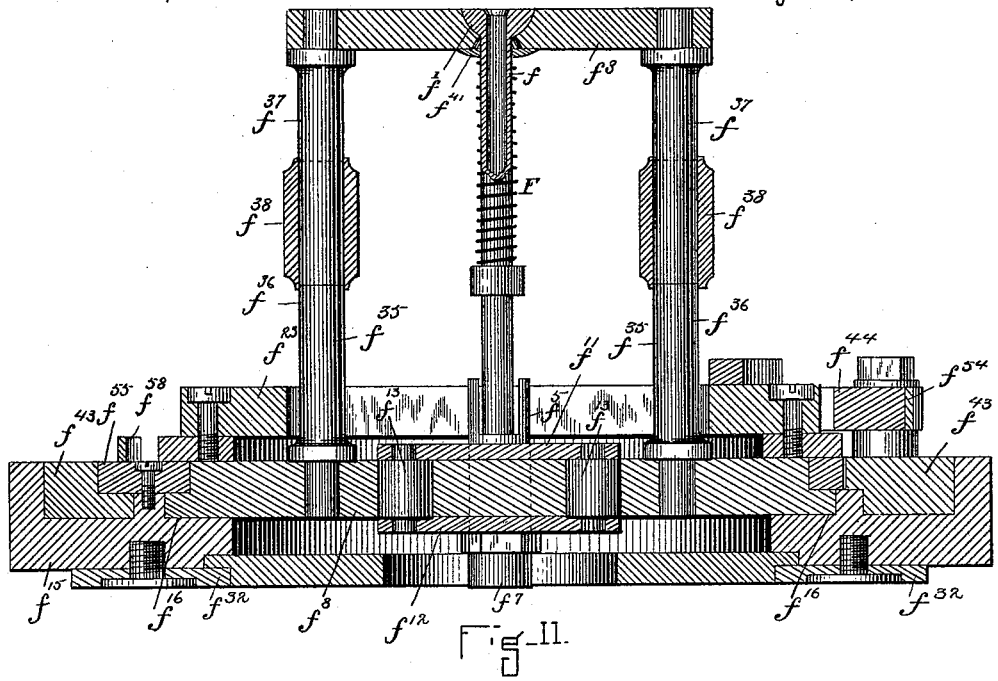
Figure 12:
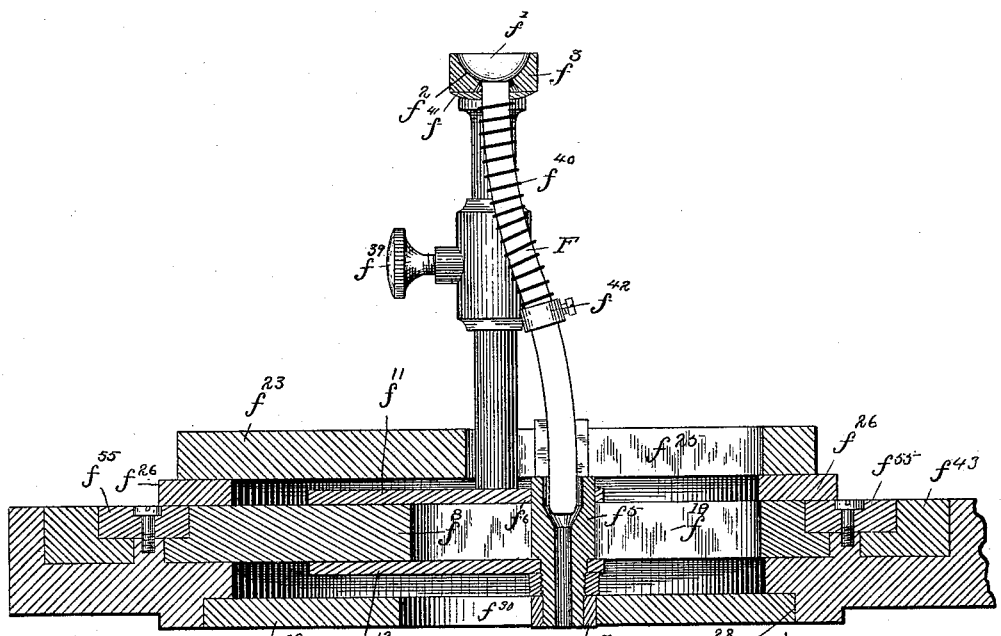

In the drawings, Figure 1 is a view in side elevation of the complete machine. Fig. 2 is a view in front elevation thereof. Fig. 3 is a view in vertical section, enlarged, taken through the nail pointing and severing dies, rolls, and feed-rolls, showing in elevation some of the parts back of said line. Fig. 4 is a view principally in horizontal section upon the line of the die-roll shafts. Fig. 5 is a detail view, in vertical section, to illustrate the relation which the nail-transferrer bears to the die-rolls and also showing parts of the distributer stop mechanism and the stop mechanism for stopping the nail-making machine. Figs. 6 and 7 are detail views of the mechanism for feeding the wire from which the nails are made and adjusting the degree or extent of the feed. Fig. 8, taken in connection with Fig. 7, represents an adjustment of the feed-rolls, to which reference is hereinafter made. Fig. 9 is a view principally in vertical section upon the line $x\,x$ of Fig. 1. Fig. 10 is a view in plan, enlarged, of the distributer. Fig. 11 is a view principally in vertical section of the distributer. Fig. 12 is a view principally in vertical section upon a right angle to the section of Fig. 11. Figs. 13 and 14 represent parts of the distributer, to which reference is hereinafter made. Fig. 15 is a view of the distributer in plan inverted. Fig. 16 represents the relation which the driver or clearer bears to the transferrer and distributer passage at the end of its downward movement. Fig. 17 is a sectional detail view of the parts represented in Fig. 6.

The machine as a whole embraces nail-making devices, a nail-transferring device, and a nail-distributer.

The nail-making devices comprise the two rolls A A', mounted at the front end of their respective shafts $a\;a'$. These shafts have suitable bearings at $a^2$ and $a^3$ in the frame $A^2$, and they are connected with each other by the gears $a^4\;a^5$, placed close to the bearing $a^2$, and the gears $a^6\;a^7$ placed close to the bearing $a^3$ and near the back ends of the shafts. The shaft $a'$ is extended sufficiently beyond the shaft $a$ to carry a gear-wheel $a^8$, by which power is communicated to the shafts. The rolls A A', it will be seen, are mounted at the extreme front end of the frame and are practically open or exposed on all sides. They carry or support the three nail pointing and severing devices $A^3\,A^4\,A^5$. (See Fig. 3.) Each of these nail pointing and severing devices preferably is placed quite close to the front surface $a^9$ of the rolls, and each preferably comprises a male section $a^{10}$ of a drawing-die mounted upon the roll A', and the female or box section $a^{11}$ of a drawing-die mounted upon the roll A, and the cut-off $a^{12}$ and presser $a^{13}$.

The cut-offs $a^{12}$ extend inward from their respective dies toward the center of the roll A', and with the dies are equidistant from each other. The roll A' has a central hole $a^{14}$ extending through it, into which the inner ends $a^{15}$ of the cut-offs extend. Each presser $a^{13}$ is forced outward by a spring $a^{16}$. The shaft $a'$, carrying the roll A', is made hollow in part, the hole $a^{17}$ extending from its front end backward about half its length and receives a rod $a^{18}$. This rod $a^{18}$ has a pointed or beveled front end $a^{19}$, (see Fig. 4,) and is moved lengthwise the roll to bring its end $a^{19}$ into contact with the ends $a^{15}$ of the cut-offs three times in each full revolution of the roll A'. This movement is represented as given the rod by means of a grooved sleeve $a^{20}$, arranged to slide a limited distance upon the shaft $a'$ and connected with the rod $a^{18}$ by means of a suitable connection or pin $a^{21}$, which passes through a slot $a^{22}$ of proper length in the shaft $a'$. The sleeve is moved at the proper interval of time by means of the lever $a^{23}$, (see Fig. 1,) pivoted at $a^{24}$ to a section $A^6$ of the frame and connected with the sleeve by means of pins $a^{25}$, which enter the groove therein, and a cam projection $a^{26}$ on the back of a cam-disk B, carried by the cam-shaft $b$, the upper end of the lever $a^{23}$ having a cam-roll against which the cam projection $a^{26}$ is brought into contact and the roll is held against the back of the cam-disk B by means of a spring $a^{27}$, (see Fig. 4,) attached to the frame at one end and to the lower end of the lever $a^{23}$ at the other. The cam-shaft $b$ makes three revolutions for every single revolution of the shafts $a$ $a'$. It has bearings $b'$ near its front end in the section $A^6$ of the frame and a bearing $b^2$ near its rear end in the section $A^6$ of the frame. It carries at its rear end a loose pulley B' by which the machine is driven, having upon its hub a member $b^3$ of the clutch, and the movable member $b^4$ of the clutch, which has a clutch member or teeth $b^5$ to engage the clutch $b^3$, the small gear or pinion $b^6$ to engage the driving-gear $a^8$ on the shaft $a'$, and the grooved sleeve $b^7$, which receives the roll $b^8$ on the yoke-arms $b^9$ of the straight lever $b^{10}$. This lever is pivoted at $b^{11}$, (see Fig. 5,) and has at its lower end a long latch-bar $b^{12}$ pivoted thereto and extending horizontally to a position to be moved by the distributer, as will hereinafter be specified. The movement of this latch-bar $b^{12}$ serves to disengage the driven member $b^5$ of the clutch from the driving member $b^3$, while the spring $b^{13}$, (see Fig. 5,) attached at one end to the frame and at its other end to the latch-bar $b^{12}$, serves upon the release of the latch-bar to move the driven member $b^5$ of the clutch into engagement with the driving member $b^3$ and to hold it in such engagement until the machine is stopped by a movement of the latch-bar $b^{12}$. The cam-shaft $b$ carries at its front end the cam-disk B above referred to. This cam-disk not only serves to operate the cut-offs $a^{12}$, as above specified, but it has in its face a cam-groove $b^{14}$, which governs the movement of the wire-feed.

The wire or nail strip feeding mechanism comprises the feed-rolls C C', placed above the die-rolls A A', and preferably having roughened or corrugated feeding-surfaces. The roll C' is secured to the end of a short shaft $c$, which has a bearing $c'$ in the section $A^6$ of the frame, and it extends beyond the back face of said bearing sufficiently to receive a ratchet-wheel $c^2$, by which movement is imparted to it through the medium of a lever $c^3$, pivoted or fulcrumed on the end of the shaft $c$ and having a slot $c^4$, which receives a slide-block $c^5$, which is connected by a link $c^6$ to a cam-pin $c^7$, entering the cam-groove $b^{14}$ of the cam-disk B, the link being also connected with another link $c^8$, which is pivoted to the section $A^6$ of the frame at $c^9$. This lever $c^3$ carries from the side of its outer end two feed-pawls $c^{10}$ $c^{11}$, one of which is a little shorter than the other, and which engages the teeth of the ratchet $c^2$, the spring $c^{12}$ maintaining them in contact therewith. The extent of the feed movement is varied by the slide-block $c^5$ and by the ratchet-covering plate $c^{13}$. (See Figs. 1 and 2.) The slide-block $c^5$ is adjustable lengthwise the lever $c^3$ by means of an adjusting-screw $c^{14}$, having bearings at $c^{15}$ and $c^{16}$ on the side of the lever $c^3$ and passing through a nut $c^{17}$ on the slide-block. The lever $c^3$ also has a clamp $c^{18}$, operated by a screw $c^{19}$ to embrace a section of the adjusting-screw, and by means of which the adjusting-screw is locked in any desired position after it has been turned to adjust or move the slide-block $c^5$. The movement of the slide-block $c^5$ upon the lever $c^3$ of course varies the range or extent of movement of the feed-pawls $c^{10}$ $c^{11}$. When moved outward, it decreases the extent of such movement, and when moved inward or toward the fulcrum it increases it. The slide-plate $c^{13}$ fixes the point at which the pawls engage the ratchet. It is hung upon the shaft $c$, between the ratchet-wheel and the bearing $c'$, and it is shaped to cover a section of the ratchet-teeth, and it is movable over said teeth and is locked in any desired position by a clamp-nut $c^{20}$, carried by a bracket $c^{21}$ and entering a curved slot $c^{22}$ in the covering-plate. By loosening the clamp-nut the plate may be moved. By tightening it it is locked in any desired position. The feed-roll C is eccentrically mounted upon the short shaft $c^{23}$, which has a bearing $c^{24}$ in the section $A^6$ of the frame of the machine. It is eccentrically mounted in order that the roll C may be moved toward and from the roll C' for two reasons: first, to enable the rolls to take wire or nail strip varying in size, and, second, to enable one roll to be moved relatively in relation to the other sufficiently to permit the wire or nail strip to be easily fed to the machine and drawn or removed from the machine. The roll C is of course free to rotate on its eccentric bearing, the shaft $c^{23}$ being only rotated for the purpose of changing the position of the eccentric bearing of the roll, and this movement is imparted to it by means of a lever $c^{25}$, secured to its rear end $c^{26}$, having a handle $c^{27}$ and a clamp-nut $c^{28}$, which is connected by a screw with the lever, the screw passing through a curved slot $c^{29}$ in a fixed plate $c^{30}$, against the face of which the clamp-nut is brought to bear to lock the lever. (See Fig. 6.) The wire or nail stock is fed to the feed-rolls through a throat $c^{31}$ and from the feed-rolls to the pointing and severing devices through another throat $c^{32}$ in a fixed tube $c^{33}$. This completes the mechanism for making and severing the nails.

To receive the severed nails as they are made and to transfer them to a position from which they are fed to the distributer, I use a block E, mounted upon or formed at the front end of a slide-bar $e$, (see Fig. 3,) shaped at its upper end to bring its surfaces $e'$ $e^2$ as close to the rolls as possible and still provide room for the throat or passage $e^3$. (See Fig. 3.) The passage $e^3$ in the block is vertical and of an extent sufficient to take the longest nail, and it is open at the top and bottom—at the top to receive the nails as they are made and severed, at the bottom to deliver them, as will hereinafter be specified, when they have been moved to the delivery-point. To hold the nails in the throat or passage while they are being moved from one point to the other, I have arranged a plate $e^4$ immediately below it and over which the block is reciprocated. This plate is fastened to the base-section $A^2$ of the frame. The transferrer and its block E are given a traversing movement by means of the cylinder-cam $e^5$ on the cam-shaft $b$, the lever $e^6$, which is pivoted at $e^7$, and has a cam-pin $e^8$ to enter the groove of the cylinder-cam $e^5$, and is connected at its lower end by a link $e^9$ with the end of the slide $e$. (See Fig. 1.) The slide is detachably secured to the link by means of a removable pin $e^{10}$. The cam is timed to hold the carrier or transferrer E with its throat in position to receive the end of the nail strip or wire as it is fed and while it is being severed, and to then rapidly transfer or move the carrier to a position from which it is discharged from the throat or passage and to hold it during the operation of the discharging device and to then return it to its original position to receive the next nail in order. This completes the mechanism for transferring or carrying the nail after it has been made.

The distributer comprises a single distributing-tube F, having its upper end $f$ attached or secured to a ball-holder $f'$, having a hole in continuation of the hole in the end $f$ and held in a cup $f^2$ in a cross-bar or support $f^3$. The upper end of the tube or the throat or entrance is always in the same position, and that is beneath and in line with the hole $f^4$, formed at the outer end of the plate $e^4$. The tube itself is curved to bring its lower or delivery end out of line with a vertical line drawn through the hole $f^4$ and the entrance to the tube, and is movable radially and also rotated or turned so that its delivery end is caused to be advanced from one position to another. The lower end of the tube enters the upper end of a cylindrical sleeve $f^5$, which is secured to a slide $f^6$, and carries at its lower end a cam-roll $f^7$. The slide is supported by a rotary plate $f^8$, the plate having two parallel slots $f^9$, extending from nearly across the same, and a radial slot $f^{10}$ between them. The cylindrical piece $f^5$ passes through the slot $f^{10}$. The slide or block $f^6$ is preferably made in two sections $f^{11}$ $f^{12}$, which are secured together by the cylindrical piece $f^5$ and by pins $f^{13}$, which pass through ears formed in each of them and through the slots $f^9$. These slots $f^9$ also hold the coil-springs $f^{14}$, and each of which is attached at one end to the plate $f^8$ and at the other end to the pins $f^{13}$, connecting the two plates $f^{11}$ $f^{12}$ together. These pins $f^{13}$ and the cylindrical piece $f^5$ are of a bore sufficient to fit the slots in which they are moved. The lower end of the tube F is loosely fitted to the upper end of the sleeve $f^5$. This construction insures an easy movement to the slide-block and to the throat, and the employment of springs of durability provides a movement sufficient for the purposes to which the distributer is put. The plate $f^8$ is mounted to be rotated upon the carriage $f^{15}$, the carriage having a cylindrical recess to receive it. The carriage has the annular section $f^{16}$, in which this cylindrical recess is formed, and a projecting section $f^{17}$, the side edges of which are provided with tongues $f^{18}$, which enter grooves $f^{19}$ in the supporting-leg $f^{20}$ of the frame of the machine, to which the extension is secured by a spring-pin $f^{21}$, which enters a hole $f^{22}$ in one of the tongues $f^{18}$. This construction provides for the support of the distributer from the front end of the machine and in an exposed position and so that it is removable from the machine by simply operating the spring-pin $f^{21}$. The annular part $f^{16}$ of the carriage supports the working parts of the distributer, which, in addition to those above named, include the ratchet-plate $f^{23}$, having the ratchet-teeth $f^{24}$ in its edge (see Fig. 10) and provided with the T-shaped slot $f^{25}$. This is the feed ratchet-plate. It is attached, together with the stop ratchet-ring $f^{26}$, having the ratchet-teeth $f^{27}$, to the plate $f^8$ by screws or in any other suitable way to rotate therewith, and there is attached in a recess $f^{28}$ in the lower surface of the annular plate $f^{16}$ the cam-plate $f^{29}$, having a hole $f^{30}$, the guiding edge $f^{31}$ of which forms the cam or guide against which the cam-pin $f^7$ of the slide $f^6$ bears and is held by the springs $f^{14}$. The cam-plate $f^{29}$ is held in its recess by rotary latches or holders $f^{32}$, attached to the annular section of the frame $f^{15}$, close to the edge of the recess $f^{30}$, by screws and having one edge cut away. These latches or holders are turned by pins $f^{33}$, (see Fig. 15,) secured to their edges, and to hold the cam-plate in position they are turned sufficiently to bring sections into the recesses $f^{34}$, formed in the under surface of the cam-plate. The plate $f^8$ also supports two posts $f^{35}$, which extend upward through one section of the T-slot of the ratchet-plate and support the cross-bar $f^3$. These posts are made in two parts $f^{36}$ $f^{37}$, which are united with each other by sleeves $f^{38}$, fastened to one of the parts of the post by the set-screw $f^{39}$. This is for the purpose of enabling the tube to be quickly and easily detached from the rest of the distributer, it being simply necessary to loosen the set-screws and slide down the sleeves to detach the upper cross-bar $f^3$ and the tube. To prevent the tube from jamming and holding it in place it is surrounded with a coil-spring $f^{40}$, which bears against a washer $f^{41}$ at its upper end and against an adjustable collar $f^{42}$, secured to the tube by a set-screw at its lower end. The plate $f^{16}$ also carries a ring $f^{43}$, upon which is mounted the feed-pawl $f^{44}$, (see Fig. 10,) and which engages the teeth $f^{24}$ of the feed ratchet-plate. A back-and-forth movement is given to this ring by means of the cylindrical cam $f^{45}$ on the cam-shaft $b$ and the lever $f^{46}$, pivoted at $f^{47}$ and connected by a fork and pin $f^{48}$ with a slide $f^{49}$, mounted in an arm or bracket $f^{50}$, (see Fig. 1,) attached to the main section of the frame. The front end of this slide $f^{49}$ is connected with a pin $f^{51}$ on the ring $f^{43}$ by a link $f^{52}$. This link is removably secured to the slide by a pin $f^{53}$ in a manner to permit the pawl-ring and its operating-slide to be easily and quickly disconnected. The pawl $f^{44}$ is kept in engagement with the edge of the ratchet-plate by the spring $f^{54}$.

In order that the distributer may not be thrown by or past the point at which a nail is to be delivered, I employ the stop ratchet-plate $f^{26}$, above referred to, and I attach to a stationary ring $f^{55}$, carried by the plate $f^{16}$, a detent-pawl $f^{56}$. (See Fig. 10.) This pawl is pivoted to said plate at $f^{57}$ and is moved and held into position to engage in successive order the teeth of the detent-ring by means of a spring $f^{58}$. It also has an arm $f^{59}$, which extends outward from the detent-plate and is adapted to be actuated by a lever $f^{60}$ immediately before each feed movement of the distributer to disengage the detent-pawl from a tooth of the detent-ring with which it is in engagement and to hold it disengaged while said tooth has been moved by or beyond the end of said pawl when the lever is moved out of the way to allow the spring to move the detent into position to engage the next tooth in order. This detent-operating lever $f^{60}$ is pivoted at $f^{61}$ (see Fig. 5) to the lugs projecting from the front of the leg of the base and is connected with the nail carrier or transferrer slide $e$ to be operated thereby and by its cam. There is also attached to the distributer the stop-cam G, which is located and shaped to bear against the end of the latch-lever $b^{12}$ as the distributer approaches the end of its rotation and to then actuate or push the latch-lever sufficiently to cause it to disengage the driven from the driving member of the clutch.

To start the machine, the latch-lever is lifted from its engagement with the edge of this stop G either by hand or by a lever H, pivoted to the leg of the machine, having one arm which extends under the latch-lever and another arm which extends to any convenient point to be operated either automatically or by any machine by which the nail-distributing device may be used, and the latch-arm upon being lifted sufficiently to clear the cam is, by the spring $b^{13}$, moved over the top of the same. The cam-stop, however, is comparatively short and soon passes beyond the end of the latch and the latch then falls into position to be engaged by it after it has completed its revolution. The ring which holds the detent-lever also serves as a cap-plate to secure the plate $f^{8}$ in its recess, and as it is desirable that the distributer should not move too easily the parts are either snugly fitted to cause some friction upon the plate $f^{8}$ or there may be interposed between a surface of the plate and the cap-ring or the surface upon which the plate rests a piece of leather or other frictional device adapted to be clamped sufficiently against the surface of said plate $f^{8}$ to cause an appreciable friction thereon. The distributer not only comprises these devices, but also a discharger or clearer, which is herein represented in the form of a driver M, of flexible material, preferably wound piano-wire. This is fastened at its upper end to a slide-bar $m$, adapted to be moved in suitable ways in the casing $m'$, extending downward in front of the feed-rolls and die-rolls. The slide is moved by means of the lever $m^{2}$, connected by a link with the upper end of the slide, and a cam-groove $m^{3}$ in the cam-disk $m^{4}$ upon the cam-shaft $b$. The cam is connected with the end of the lever by means of a cam-pin $m^{5}$, attached to a slide $m^{6}$, the slide being suitably held by the bracket $m^{7}$ and being connected with the short end of the lever by the link $m^{8}$.

The cam is timed to hold the driver M so that its lower end is held above the upper end of the nail carrier or transferrer and at a point in line with the hole $f^{4}$ in the plate $e^{4}$, and upon the transfer of the nail from the nail-severing devices to a point beneath the driver and in line with said hole the driver is caused to rapidly traverse the passage of the transferrer and of the distributer, forcing or ejecting the nail from the transferrer through the tube of the distributer and at the interval of time while the transferrer is held stationary upon its outward or forward movement and also while the tube of the distributer is held stationary. After this reciprocation of the driver it is held in its highest position during the reverse movement of the nail-transferrer and while it is receiving a nail and until it is again fed forward, and also while the end of the distributing-tube is being advanced from one position to another by the partial rotation of its supporting-plate.

In operation the wire or nail strip is fed by the feeding devices to the nail pointing and severing devices, a nail pointed and severed and delivered to the carrier or transferrer and by it moved into position to be discharged by the driver or ejector through the tube of the distributer and the driver returned, the transferrer moved back to receive another nail, and the delivery end of the tube advanced into a new position. These movements continue until the distributer makes a full revolution, when the machine is automatically stopped.

By placing the sections of the dies as near the front surface of the rolls as possible the amount of travel of the nail-transferring block or carrier is made as small as possible, and this is a very desirable feature, because, as it is necessary to move this carrier very quickly, the distance should be as short as possible.

It will be seen that by supplying the rolls with two or more sets of dies, so that each full revolution of the dies points at least two nails and preferably three, and by placing the cams upon a separate shaft and transferring the power for driving the die-rolls from said cam-shaft by gearing, which reduces the speed of the cam-shaft one-half or one-third, according to the number of dies on the roll, it is possible to obtain cams which throw very quickly or are easy in their operation, while on the other hand the action of the dies in pointing is comparatively slow, and it is especially desirable that both these results be obtained—namely, that the dies act comparatively slowly, while the other parts—namely, the cut-offs, transferrer, the driver, and the distributer—be moved comparatively quickly in order to obtain the requisite amount of time necessary for the proper operation of each part.

The die-rolls A A' may be made integral with their supporting-shafts, if desired. For making unpointed nails the pointing-dies may be dispensed with.

Having thus fully described my invention, I claim and desire to secure by Letters Patent of the United States—

1. The combination of the roll, one or more radial cut-offs carried thereby, having it or their ends extending to a central hole in the roll, the roll-operating shaft also having a central hole, a cut-off-operating slide carried in the hole of said shaft, and a cam for actuating the same, substantially as described.

2. The combination of a roll, its radial cut-offs, the hollow shaft, the cut-off-actuating rod carried thereby, a sleeve upon said shaft connected with the said bar, a cam and a lever actuated thereby and connected with the sleeve, substantially as described.

3. The combination of a series of independent, successively-operating, rotary nail pointing and severing dies or devices, the single nail carrier or transferrer, the movable nail-distributing tube, and an ejector to traverse the passage of the transferrer and the hole of the tube, as and for the purposes described.

4. The combination of a series of independent, successively-operating, rotary nail pointing and severing dies or devices, a distributer having a single movable distributing-tube with a nail ejector or driver to traverse said tube, substantially as described.

5. The combination, in a distributer, of the cross-bar supporting the upper end of the distributing-tube, and having a cup-shaped recess therein, with the distributing-tube the upper end of which is held in said cup-shaped recess by a perforated ball or hemispherical holder, substantially as described.

6. The combination of the cross-bar, the distributer-tube, the cup in the cross-bar, the perforated-ball end of the tube fitting said cup and the lower end of the tube loosely connected with a slide-nozzle, and a spring to press downward upon the tube, substantially as described.

7. The combination in a distributer of a rotary plate having two posts extending upward therefrom and supporting a cross-bar carrying the distributing-tube, with a spring-actuated slide carrying a sleeve or nozzle to which the lower end of the tube connects, a cam-roll carried by said slide, and a cam or pattern against which the cam-roll is held by said spring-actuated slide, substantially as described.

8. The combination of the plate having an intermittent rotary movement imparted to it and provided with the slots $f^9$ and $f^{10}$, a slide secured to said plate as specified, and its actuating-springs contained in said slots, a cylindrical throat carried by said slide, and a cam or pattern against which it is pressed by said springs, as and for the purposes described.

9. The combination of the distributer-plate and single distributing tube or nozzle carried thereby, with the feed ratchet-plate and a feed-pawl carried by a ring having a movement upon an arc of a circle, as and for the purposes specified.

10. The combination of a distributer, the cam for operating the feed-pawl of the same, the intermediate slide, and a link connected with the end of said slide by a vertical pivot and with the ring upon which the feed-pawl is mounted in a manner to be detached, as and for the purposes described.

11. The combination of the holding-plate or frame of the distributer having an annular hole and recess about the same, a circular plate held in said recess by a cap-plate, feed ratchet-plate, and a stop ratchet-ring carried by said rotary plate, a distributing-tube movable radially at its lower end and governed as to the extent of its outward movement by a cam also carried by said plate, said cam, a ring supported by said first-named plate, a reciprocating ring carrying a feed-pawl, and a stationary detent-pawl, and a cam-plate having an interior cam edge or pattern secured in a recess in the under part of said first-named plate, substantially as described.

12. The combination, in an organized nail making and distributing machine of two die-rolls having two or more sections of nail-pointing dies thereon, the shafts supporting said rolls geared together, a cam-shaft arranged to rotate as many times faster than the roll-shafts as there are dies upon the rolls, and connected with one of the roll-shafts by a pinion and gear, the nail cut-offs and transferrer, and cams for operating the same upon said cam-shaft, substantially as described.

13. The combination, in an organized nail making and distributing machine of two die-rolls having two or more sections of nail-pointing dies thereon, the shafts supporting said rolls geared together, a cam-shaft arranged to rotate as many times faster than the roll-shafts as there are dies upon the rolls, and connected with one of the roll-shafts by a pinion and gear, the nail cut-offs, transferrer, and nail ejector or driver operated by cams upon said cam-shaft, substantially as and for the purposes described.

14. The combination, in an organized nail making and distributing machine, of two die-rolls having two or more sections of nail-pointing dies thereon, the shafts supporting said rolls geared together, a cam-shaft arranged to rotate as many times faster than the roll-shafts as there are dies upon the rolls, and connected with one of the roll-shafts by a pinion and gear, the nail cut-offs, transferrer, nail ejector or driver, and nail-distributer of the character specified, operated by cams upon said cam-shaft, substantially as and for the purposes described.

CHESTER C. SMALL.

In presence of—
F. F. RAYMOND, 2d,
J. T. BALL,
A. P. PORTER.